(12) United States Patent
Hass et al.

(10) Patent No.: US 11,711,384 B2
(45) Date of Patent: Jul. 25, 2023

(54) METHOD AND SYSTEM FOR DETECTING MESSAGE INJECTION ANOMALIES

(71) Applicant: Lear Corporation, Southfield, MI (US)

(72) Inventors: William D. Hass, Ann Arbor, MI (US); Lars Wolleschensky, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 790 days.

(21) Appl. No.: 16/112,874

(22) Filed: Aug. 27, 2018

(65) Prior Publication Data

US 2020/0067955 A1    Feb. 27, 2020

(51) Int. Cl.
*H04L 9/40*     (2022.01)
*G06F 13/36*    (2006.01)
*H04L 12/40*    (2006.01)

(52) U.S. Cl.
CPC .......... *H04L 63/1425* (2013.01); *G06F 13/36* (2013.01); *H04L 12/40013* (2013.01); *H04L 63/1416* (2013.01)

(58) Field of Classification Search
CPC . H04L 63/1416; H04L 63/1425; H04L 63/14; H04L 63/1466; H04L 2209/84; H04L 12/40; H04L 12/40013; H04L 2012/40215; G06F 21/56
See application file for complete search history.

(56) References Cited

U.S. PATENT DOCUMENTS

| 8,955,130 | B1* | 2/2015 | Kalintsev | G06F 21/567 |
| | | | | 726/23 |
| 9,613,211 | B1* | 4/2017 | Chen | G06F 21/566 |
| 10,083,071 | B2* | 9/2018 | Sonalker | G06F 11/0739 |
| 11,190,533 | B2* | 11/2021 | Tsurumi | B60R 16/0232 |
| 11,516,045 | B2* | 11/2022 | Maeda | B60R 16/023 |
| 2012/0274260 | A1* | 11/2012 | Takahashi | H02P 29/0243 |
| | | | | 318/490 |

(Continued)

FOREIGN PATENT DOCUMENTS

| CN | 102761309 A | 10/2012 |
| CN | 104956626 A | 9/2015 |

OTHER PUBLICATIONS

K. Iehira, H. Inoue and K. Ishida, "Spoofing attack using bus-off attacks againsta specific ECU of the CAN bus," 2018 15th IEEE Annual Consumer Communications & Networking Conference (CCNC), Las Vegas, NV, USA, 2018, pp. 1-4. (Year: 2018).*

(Continued)

*Primary Examiner* — Kari L Schmidt
(74) *Attorney, Agent, or Firm* — Brooks Kushman P.C.

(57) ABSTRACT

A method and system for detecting illegitimate messages injected into legitimate messages of a bus, such as a Controller Area Network (CAN) bus, are provided. Legitimate messages are broadcasted over the bus with a period whereby the legitimate messages are periodic legitimate messages. A controller connected to the bus receives at a first time instant a first message from the bus and receives at a second time instant a second message from the bus. The controller compares a first difference in time between the second time instant and the first time instant with a limit. The limit is two-thirds of the period. An anomaly is detected when the first difference in time is less than the limit.

4 Claims, 4 Drawing Sheets

(56) References Cited

U.S. PATENT DOCUMENTS

| | | | |
|---|---|---|---|
| 2014/0036987 A1* | 2/2014 | Kashima | H03K 7/08 375/238 |
| 2014/0115403 A1* | 4/2014 | Rhee | G06F 11/3466 714/38.1 |
| 2014/0310530 A1* | 10/2014 | Oguma | H04L 9/3242 713/181 |
| 2015/0113638 A1* | 4/2015 | Valasek | G06F 21/562 726/22 |
| 2015/0358351 A1 | 12/2015 | Otsuka et al. | |
| 2016/0173513 A1* | 6/2016 | Rohde | H04L 12/4625 726/23 |
| 2016/0188396 A1* | 6/2016 | Sonalker | G06F 11/0739 714/37 |
| 2016/0205194 A1 | 7/2016 | Kishikawa et al. | |
| 2016/0381068 A1* | 12/2016 | Galula | H04L 63/123 726/23 |
| 2017/0324579 A1* | 11/2017 | Takada | H04L 12/40156 |
| 2018/0025156 A1* | 1/2018 | Dagan | H04L 63/1458 713/161 |
| 2018/0091533 A1 | 3/2018 | Yajima et al. | |
| 2018/0152464 A1* | 5/2018 | Yajima | H04L 9/12 |
| 2018/0196941 A1* | 7/2018 | Ruvio | H04L 63/0227 |
| 2018/0300477 A1* | 10/2018 | Galula | H04L 63/1416 |
| 2018/0316584 A1* | 11/2018 | Ujiie | H04W 4/48 |
| 2018/0343262 A1* | 11/2018 | Anderson | B60R 16/0234 |
| 2019/0007427 A1* | 1/2019 | Yajima | H04L 63/1425 |
| 2019/0044912 A1* | 2/2019 | Yang | G06F 9/45558 |
| 2019/0238586 A1* | 8/2019 | Hong | H04L 12/40 |
| 2021/0203682 A1* | 7/2021 | Bajpai | G06F 21/55 |
| 2022/0001835 A1* | 1/2022 | Kim | B60R 25/00 |
| 2022/0156367 A1* | 5/2022 | Stein | G06F 21/85 |
| 2022/0159018 A1* | 5/2022 | Kim | H04W 4/48 |
| 2022/0263849 A1* | 8/2022 | Ujiie | H04L 67/12 |

OTHER PUBLICATIONS

Clinton Young et al. 2019. Automotive Intrusion Detection Based on Constant CAN Message Frequencies Across Vehicle Driving Modes. In Proceedings of the ACM Workshop on Automotive Cybersecurity (AutoSec '19). Association for Computing Machinery, New York, NY, USA, 9-14. (Year: 2019).*

H. M. Song, H. R. Kim and H. K. Kim, "Intrusion detection system based on the analysis of time intervals of CAN messages for in-vehicle network," 2016 International Conference on Information Networking (ICOIN), Kota Kinabalu, Malaysia, 2016, pp. 63-68. (Year: 2016).*

The State Intellectual Property Office of People's Republic of China, First Office Action for corresponding Chinese Patent Application No. 201910360400.6, dated Jun. 29, 2022.

* cited by examiner

METHOD AND SYSTEM FOR DETECTING MESSAGE INJECTION ANOMALIES

TECHNICAL FIELD

The present invention relates to detecting malicious messages injected into benign periodic traffic of a Controller Area Network (CAN) bus.

BACKGROUND

A Controller Area Network (CAN) bus allows devices connected to the CAN bus to communicate with one another. The devices communicate by broadcasting CAN data frames ("messages") over the CAN bus. All the devices can receive the messages over the CAN bus. The messages include identification information ("CAN ID"). The CAN ID of a message to be paid attention to by a device is stored in advance by the device. The device acts upon a received message having the CAN ID stored by the device. Conversely, the device ignores a received message having a CAN ID not stored by the device.

Messages may be broadcasted periodically over the CAN bus. A device having the CAN ID of periodic messages pays attention to these received periodic messages. A problem is when the CAN bus is attacked with a malicious message having the same CAN ID as the CAN ID of the periodic messages. The CAN bus is attacked by the malicious message being injected into the periodic messages, such as by an unauthorized entity. The device having the CAN ID of the periodic messages would not ignore the received malicious message as the CAN ID of the malicious message matches the CAN ID of the periodic messages to which the device will pay attention. Consequently, the device may perform false operations according to the malicious message.

SUMMARY

A method for detecting illegitimate messages injected into legitimate messages of a bus is provided. The legitimate messages are broadcasted over the bus with a period whereby the legitimate messages are periodic legitimate messages. The method includes receiving at a first time instant, by a controller connected to the bus, a first message from the bus and receiving at a second time instant, by the controller, a second message from the bus. The method further includes comparing, by the controller, a first difference in time between the second time instant and the first time instant with a limit. The method further includes detecting, by the controller, the second message as being an illegitimate message when the first difference in time is less than the limit and detecting, by the controller, the second message as being a legitimate message when the first difference in time is greater than the limit.

In one case, the second message is an illegitimate message as the first difference in time is less than the limit. In this case, the method may further include receiving at a third time instant, by the controller, a third message from the bus. A second difference in time between the third time instant and the first time instant is compared with the limit. The third message is detected as being an illegitimate message when the second difference in time is less than the limit. The third message is detected as being a legitimate message when the second difference in time is greater than the limit.

In another case, the second message is a legitimate message as the first difference in time is greater than the limit. In this case, the method may further include receiving at a third time instant, by the controller, a third message from the bus. A second difference in time between the third time instant and the second time instant is compared with the limit. The third message is detected as being an illegitimate message when the second difference in time is less than the limit. The third message is detected as being a legitimate message when the second difference in time is greater than the limit.

The bus may be a Controller Area Network (CAN) bus. The CAN bus may be part of a vehicle and the controller may be a part of a vehicle gateway or a part of a vehicular electronic control unit (ECU).

Another method for detecting illegitimate messages injected into legitimate messages of a bus, such as a CAN bus, is provided. Again, the legitimate messages are broadcasted over the bus with a period whereby the legitimate messages are periodic legitimate messages. This method includes receiving at a first time instant, by a controller connected to the bus, a first message from the bus and receiving at a second time instant, by the controller, a second message from the bus. This method further includes comparing, by the controller, a first difference in time between the second time instant and the first time instant with a limit. The limit is two-thirds of the period. This method further includes detecting, by the controller, an anomaly when the first difference in time is less than the limit and detecting, by the controller, no anomaly when the first difference in time is greater than the limit.

This method may further include receiving at a third time instant, by the controller, a third message from the bus and comparing a second difference in time between the third time instant and the second time instant with the limit. An anomaly is detected when the second difference in time is less than the limit. No anomaly is detected when the second difference in time is greater than the limit.

This method may further include receiving at a fourth time instant, by the controller, a fourth message from the bus and comparing a third difference in time between the fourth time instant and the third time instant with the limit. An anomaly is detected when the third difference in time is less than the limit. No anomaly is detected when the third difference in time is greater than the limit.

An electronic control unit (ECU) for use with a bus, such as a CAN bus, is provided. The ECU includes a receiver and a controller. The receiver is configured to receive messages from the bus. Legitimate messages are broadcasted over the bus with a period whereby the legitimate messages are periodic legitimate messages. The receiver receives at a first time instant a first message from the bus and further receives at a second time instant a second message from the bus. The controller is configured to compare a first difference in time between the second time instant and the first time instant with a limit. The limit is two-thirds of the period. The controller is further configured to detect an anomaly when the first difference in time is less than the limit and detect no anomaly when the first difference in time is greater than the limit.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
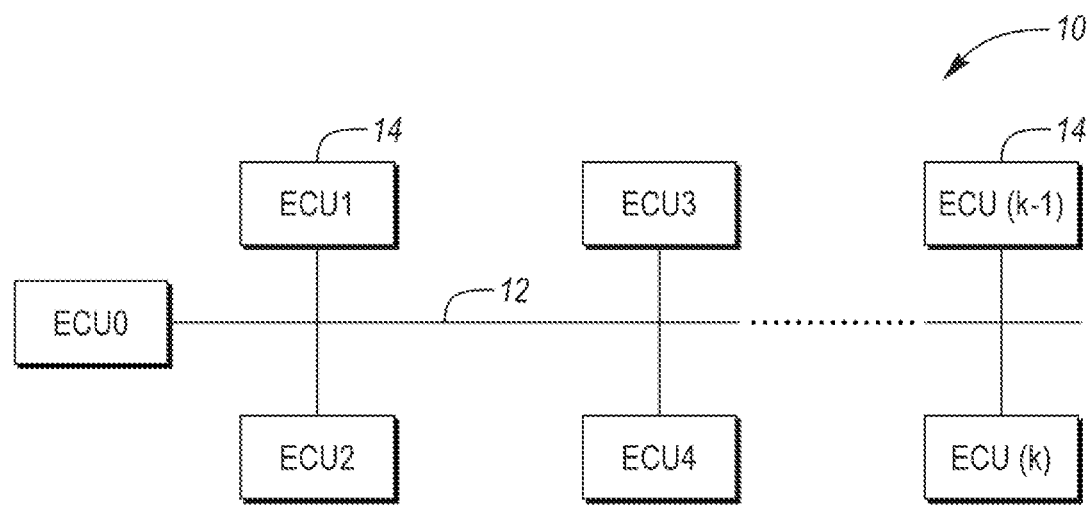
FIG. 1 illustrates a communications network including a Controller Area Network (CAN) bus having a plurality of electronic control units (ECUs) connected thereto, at least one of the ECUs being configured to detect malicious messages injected into benign periodic messages of the CAN bus in accordance with the present disclosure.

Referring now to FIG. 1, a communications network 10 including a Controller Area Network (CAN) bus 12 is shown. A plurality of electronic control units (ECUs) 14 are connected to CAN bus 12. For instance, communications network 10 may be an on-board network of a vehicle. In this case, ECUs 14 are or form part of devices of the vehicle. For example, ECUs 14 may be or form part of vehicle devices such as a vehicle gateway, an engine control unit, a transmission control unit, an airbag control unit, a power windows control unit, a braking control unit, etc.

ECUs 14 periodically broadcast CAN data frames ("messages") over CAN bus 12 to communicate with one another. ECUs 14 store in advance the CAN ID of messages to be paid attention to by the ECUs. ECUs 14 act upon received messages which have the CAN ID stored by the ECUs. Conversely, ECUs 14 ignore received messages which do not have the CAN ID stored by the ECUs.

As an example, with reference to FIG. 1, messages having the CAN ID A and messages having the CAN ID B are periodically broadcasted over CAN bus 12; ECU0 is to pay attention to messages having the CAN ID A; ECU1 is to pay attention to messages having the CAN ID B; and ECU2 is to pay attention to messages having the CAN ID A or the CAN ID B. Thus, ECU0 acts upon received messages having the CAN ID A and ignores received messages having the CAN ID B; ECU1 acts upon received messages having the CAN ID B and ignores received messages having the CAN ID A; and ECU2 acts upon received messages having the CAN ID A and acts upon received messages having the CAN ID B.

A problem is when CAN bus 12 is attacked with a malicious message having the same CAN ID as the CAN ID of the periodic messages to be acted upon by an one or more ECUs 14. The malicious message is injected into the periodic messages, such as by an unauthorized entity, and represents an attack of CAN bus 12. An ECU 14 would not ignore a received malicious message having the same CAN ID as the CAN ID of periodic messages to be acted upon by the ECU. Consequently, ECU 14 may perform false operations according to the malicious message.

As will be described in greater detail herein, at least one of ECUs 14 in accordance with the present disclosure is configured to detect malicious messages injected into benign periodic messages of CAN bus 12.

Figure 2:
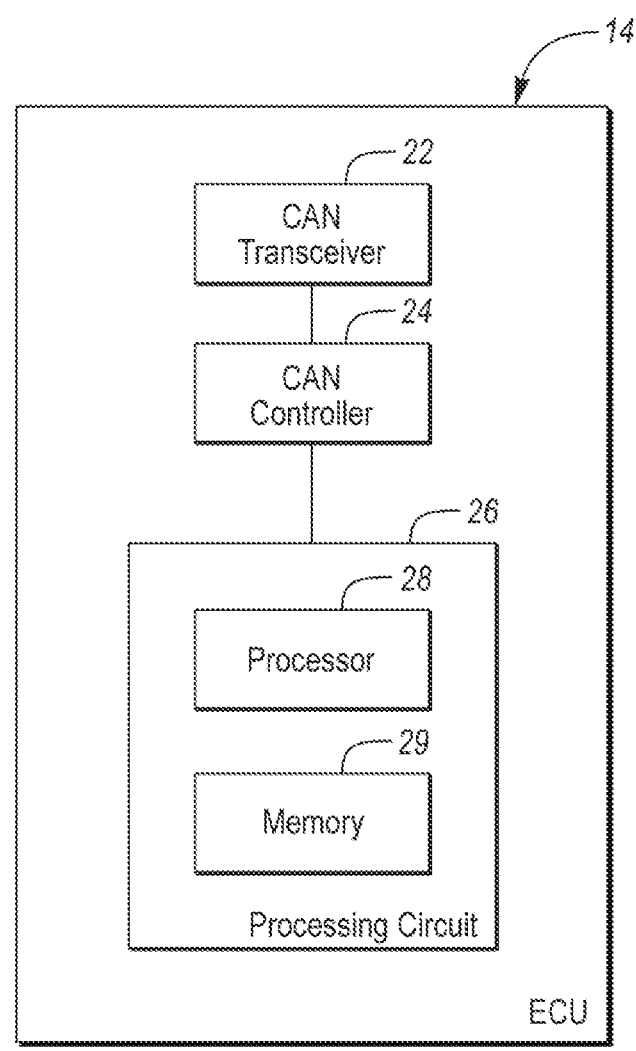
FIG. 2 illustrates a block diagram of one of the ECUs such as an ECU that in accordance with the present disclosure is configured to detect malicious messages injected into benign periodic messages of the CAN bus.

Referring now to FIG. 2, with continual reference to FIG. 1, a block diagram of an ECU 14 is shown. ECU 14 shown in FIG. 2 is an ECU that is configured to detect malicious messages injected into benign periodic messages of CAN bus 12. However, ECU 14 shown in FIG. 2 could be one of the ordinary ECUs.

ECU 14 includes a CAN transceiver 22, a CAN controller 24, and a processing circuit 26. Processing circuit 26 such as an electronic central processing unit (CPU) includes a processor or controller ("controller") 28 and a memory 29. CAN transceiver 22 performs processing such as bus voltage adjustment as appropriate so that ECU 14 can communicate with other devices connected to CAN bus 12. CAN controller 24 extracts data of received messages and outputs the data to controller 28. Controller 28 processes the data in accordance with instructions stored in memory 29.

Controller 28 carries out operation for detecting malicious messages injected into benign periodic messages of CAN bus 12. In this regard, in general, controller 28 stores a timestamp when a message is received. Upon receiving a subsequent message with the same CAN ID, controller 28 compares the newly received timestamp with the prior received timestamp to determine whether a configurable minimum time has passed between received messages with the same CAN ID. If the difference is less than the minimum time, then an anomaly is reported. The anomaly may be indicative of the presence of a malicious message. One or more anomalies can be used to generate an alert. If the difference is greater than the minimum time, then the newly received timestamp becomes the prior received timestamp for the next comparison cycle.

As an example, controller 28 stores a first timestamp when a first message having the CAN ID A is received and stores a second timestamp when a second message having the CAN ID A is received. Controller compares the timestamps to determine whether a minimum time has passed (i.e., second timestamp−first timestamp<minimum time?). If the difference is less than the minimum time (meaning that the second message has arrived too quickly relative to the first message in consideration of known message periodicity), then an anomaly is reported.

Figure 3:
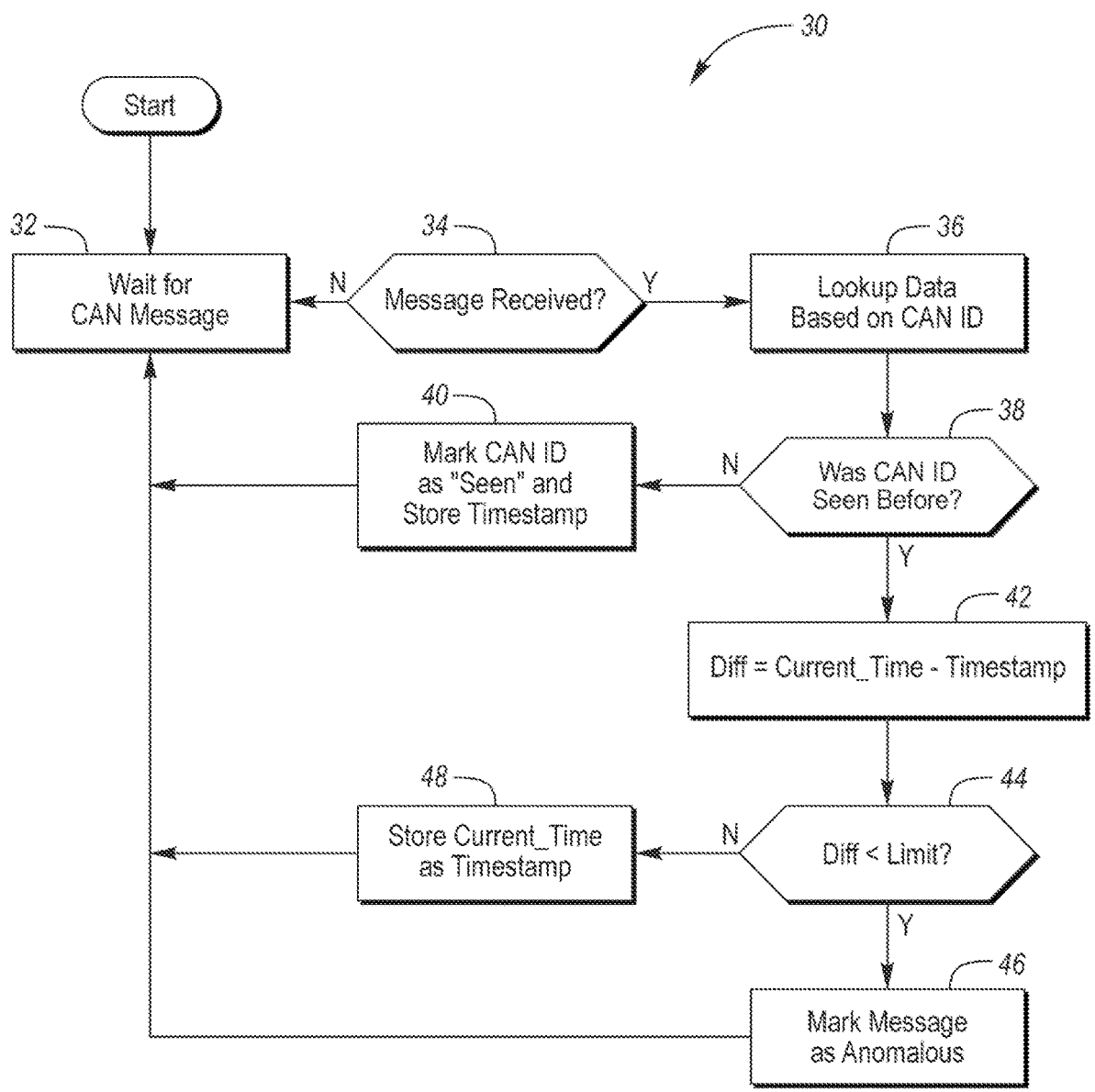
FIG. 3 illustrates a flowchart depicting operation of a method and system for detecting malicious messages injected into benign periodic messages of the CAN bus in accordance with the present disclosure.

More particularly, FIG. 3 illustrates a flowchart 30 depicting operation of a method and system for detecting malicious messages injected into benign periodic messages of CAN bus 12 in accordance with the present disclosure. Controller 28 of ECU 14 carries out the operation in accordance with instructions stored in memory 29.

As shown in flowchart 30, controller 28 begins the operation by waiting for a message to be received from CAN bus 12 by ECU 14, as indicated in block 32. Controller 28 continuously monitors for whether a message has been received by ECU 14, as indicated in decision block 34. Upon ECU 14 receiving a message, controller 28 processes the data of the message to obtain the CAN ID of the message, as indicated in block 36. Controller 28 then checks to see whether a message with the same CAN ID was previously received by ECU 14, as indicated in decision block 38. If a message with the same CAN ID was not yet received by ECU 14, then controller 28 marks the CAN ID as "seen" and stores the timestamp of the message, as indicated in block 40. The stored timestamp of the message is indicative of the time at which ECU 14 received the message. The message is now considered as being the previous message. The process then repeats with controller 28 waiting for a next message to be received from CAN bus 12 by ECU 14. The next message received by ECU 14 with the same CAN ID will be considered as the current message.

Upon ECU 14 receiving the next message (i.e., the current message) with the same CAN ID as the previous message, controller 28 determines in decision block 38 that the previous message with the same CAN ID as the current message was previously received by the ECU. Controller 28 then determines a difference in time at which ECU 14 received the current message and the previous message as indicated in block 42. Controller 28 determines the difference in time between the messages by subtracting the timestamp of the previous message from the timestamp of the current message. Controller 28 then determines whether the difference in time between the messages is less than a configurable limit, as indicated in decision block 44.

If the difference in time between the messages is less than the limit, then controller 28 marks the current message as being anomalous, as indicated in block 46. The difference in time between the messages being less than the limit means that receipt of the current message relative to receipt of the previous message is too quick, which is an indicator that something may be wrong with either the previous message or the current message. The process then repeats with controller 28 waiting for a subsequent next message with the same CAN ID to be received from CAN bus 12 by ECU 14, as indicated in block 32.

If the difference in time between the messages is greater than the limit, then controller 28 determines that the current message is proper (i.e., not anomalous). The difference in time between the messages being greater than the limit means that receipt of the current message relative to receipt of the previous message is not too quick. In this case, controller 28 stores the timestamp of the current message in place of the timestamp of the previous message, as indicated in block 48. As such, controller 28 updates the current message as being the previous message. The timestamp of the original previous message is not of further use. The process then repeats with controller 28 waiting for a subsequent next message with the same CAN ID to be received from CAN bus 12 by ECU 14, as indicated in block 32.

As indicated, the minimum time (i.e., the limit) to which the difference in time between receipt of messages with the same CAN ID is compared is configurable. The method and system in accordance with the present disclosure configure the limit based on a known periodicity of the messages. In this regard, the messages are periodic messages which are periodically broadcasted over CAN bus 12. For example, the period of the messages is 100 milliseconds. Thus, under ideal conditions for communications network 10, ECU 14 would receive one of the periodic messages exactly every 100 milliseconds. (The period of the messages with the CAN ID A may be and likely is different than the period of the messages with the CAN ID B.)

The value of the periodicity of the messages is a known value that is set according to the operating characteristics of CAN bus 12. As such, in this example, controller 28 knows that the period of the messages is 100 milliseconds. Thus, under the ideal conditions for communications network 10, controller 28 sets the limit as being 100 milliseconds. In this case, controller 28 compares the difference between the time of receipt of a current message and the time of receipt of the immediate previous message having the same CAN ID to the limit of 100 milliseconds. If the difference is less than 100 milliseconds, meaning that the current message was received quicker than exactly 100 milliseconds from the previous message at which the current message was expected to be received, then a likely explanation is that the previous message or the current message is an unauthorized message injected into the communications of CAN bus 12. Such an unauthorized message may be a malicious message depending on the contents of the message.

A problem is that non-deterministic jitter exists in communications network 10. That is, there is non-deterministic jitter in CAN traffic. Due to the jitter, ECU 14 receives the periodic messages with some deviation to every 100 milliseconds. For instance, due to the jitter, ECU 14 may receive one of the periodic messages at 98 milliseconds after the immediate previous message and may receive another one of the periodic messages at 103 milliseconds after the immediate previous message. In both cases, the received periodic message is a proper message. However, in the former case, with the limit set to 100 milliseconds, controller 28 would determine an anomaly is present as 98 milliseconds (i.e., the difference in time between receipt of the received periodic message and the immediate previous message) is less than 100 milliseconds (i.e., the limit).

Therefore, as will be explained in greater detail herein, in accordance with the present disclosure, the method and system in accordance with the present disclosure (such as by way of controller 28) configure the limit to account for the presence of the jitter as a function of the period of the messages.

Figure 4:
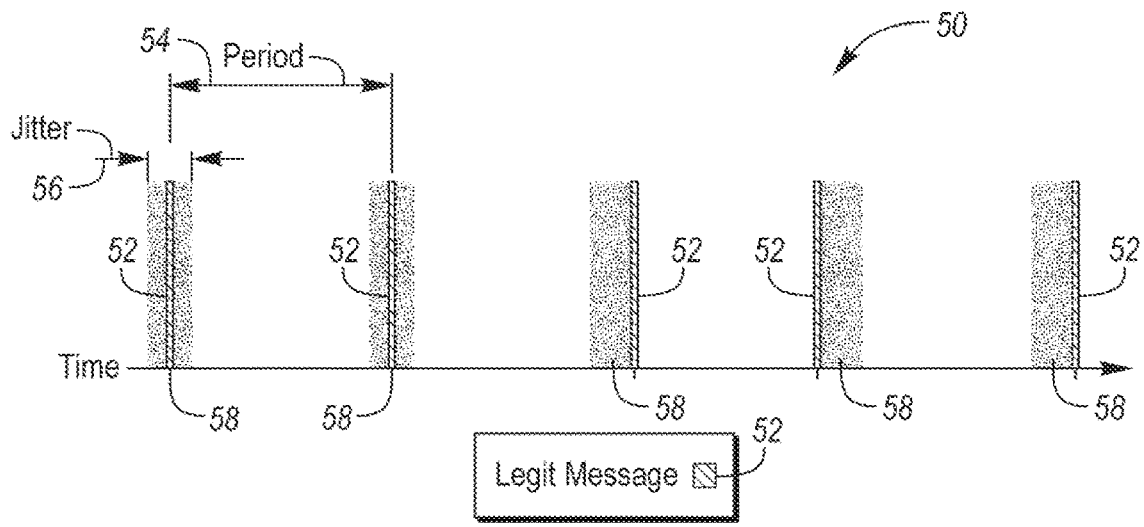
FIG. 4 illustrates a timing diagram depicting message spacing in model CAN bus operation considered by the method and system in accordance with the present disclosure.

Referring now to FIG. 4, with continual reference to FIG. 3, a timing diagram 50 depicting message spacing in model CAN bus operation considered by the method and system in accordance with the present disclosure is shown. As described, a goal of the method and system is to detect any malicious messages injected into the benign periodic messages of CAN bus 12. A challenge to this goal is that non-deterministic jitter exists in the CAN bus. The method and system operate under the assumption that the jitter is symmetrical and bounded. The method and system are capable to monitor for configuration of the period of each CAN ID (i.e., the value of the period of periodic messages having the same CAN ID is known by controller 28).

Timing diagram 50 of the message spacing of the model CAN bus operation illustrates a set of periodic messages 52 which are received by an ECU. Periodic messages 52 are periodically broadcasted over the CAN bus with a period 54. The value of period 54 (e.g., 100 milliseconds) is known. Thus, under ideal conditions, periodic messages 52 would be respectively located at period intervals 58 of 100 milliseconds.

However, as further indicated in timing diagram 50, jitter 56 is present. Jitter 56 is symmetrical and bounded relative to period intervals 58 as illustrated in timing diagram 50. As further illustrated in timing diagram 50, all periodic messages 52 are received by the ECU within the duration of jitter 56 relative to period intervals 58. Thus, when accounting for jitter 56, all periodic messages 52 are proper (i.e., legitimate) messages. That is, none of periodic messages 52 are unauthorized messages as the periodic messages are all received at expected times when accounting for jitter 56.

A problem is that although jitter 56 is symmetrical and bounded, the value of the jitter is unknown. In this respect, jitter 56 shown in timing diagram 50 is simply an example of the duration of the jitter which may be present, but the value (i.e., duration) of the jitter is unknown.

The method and system in accordance with the present disclosure derive a worst case bound on the jitter based on the malicious message detection process provided by the method and system. That is, the method and system derive the largest tolerance for the jitter which the malicious message detection process provided by the method and system can take to function optimally.

Figure 5A:
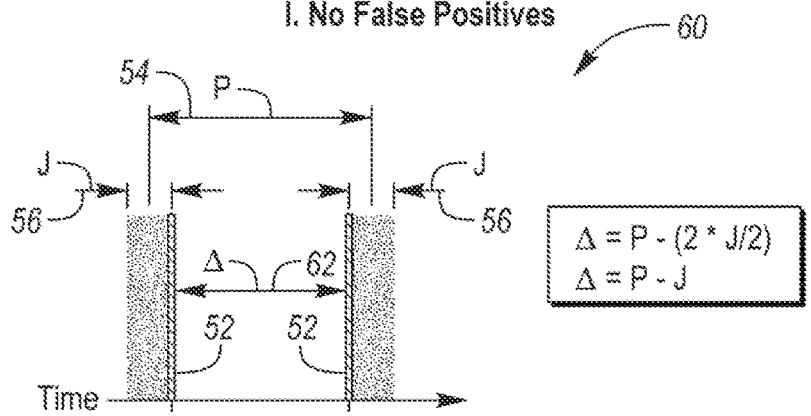
FIG. 5A illustrates a timing diagram involving a "no false positives" message spacing jitter analysis of CAN bus operation considered by the method and system in accordance with the present disclosure.
Figure 5B:
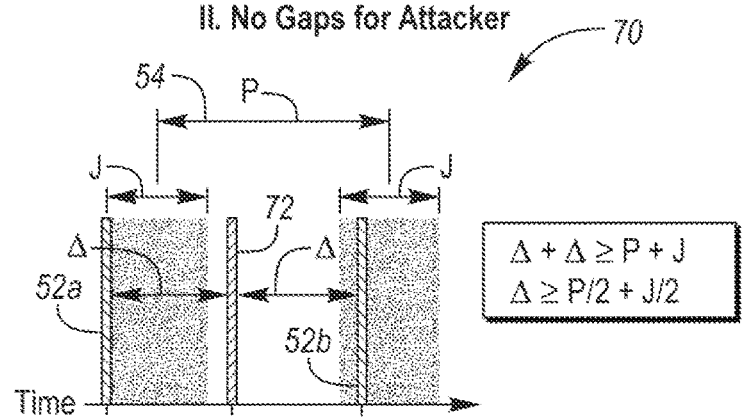
FIG. 5B illustrates a timing diagram involving a "no gaps for attacker" message spacing jitter analysis of CAN bus operation considered by the method and system in accordance with the present disclosure.

Referring now to FIGS. 5A and 5B, the derivation of the largest tolerance for the jitter which the malicious message detection process provided by the method and system can take to function optimally will be described. FIG. 5A illustrates a timing diagram 60 involving a "no false positives" message spacing jitter analysis of CAN bus operation considered by the method and system. FIG. 5B illustrates a timing diagram 70 involving a "no gaps for attacker" message spacing jitter analysis of CAN bus operation considered by the method and system.

In the "no false positives" message spacing jitter analysis, which is the subject of timing diagram 60 in FIG. 5A, two neighboring periodic messages 52 are assumed to be as close as possible to each other taking into consideration jitter 56 present in the CAN traffic. Periodic messages 52 are legitimate messages. A detection zone ($\Delta$) 62 extends between the two neighboring periodic messages 52. A message should not be received within detection zone ($\Delta$) 62 as such message would be received too quickly relative to the initial periodic message 52. A message received within detection zone ($\Delta$) 62 would therefore be an unauthorized message (i.e., "a false positive).

As shown in FIG. 5A, detection zone ($\Delta$) 62 is equal to the difference between the period and the jitter. That is, $\Delta=P-J$. As noted, the value of the period (P) is known, but the value of the jitter (J) is unknown. Thus, the equation $\Delta=P-J$ is known and the value of the period (P) is known, whereas the value of the jitter (J) is unknown."

In the "no gaps for attacker" message spacing jitter analysis, which is the subject of timing diagram 70 in FIG. 5B, an initial periodic message 52a is assumed to be as early as possible taking into consideration jitter present in the CAN traffic. An imaginary malicious message 72 is placed in the middle between initial periodic message 52a and succeeding periodic message 52b. A first detection zone ($\Delta$) extends from initial periodic message 52a to imaginary malicious message 72 and a second detection zone ($\Delta$) extends from imaginary malicious message 72 to succeeding periodic message 52b.

The sum of the two detection zones ($\Delta$) must be at least as much as the sum of the period and the jitter to ensure that there are no gaps for a malicious message to attack the CAN traffic. That is, $\Delta+\Delta \geq P+J$ to ensure that there are no gaps for an attacker. The equation $\Delta+\Delta \geq P+J$ reduces to $\Delta \geq P/2+J/2$.

Thus, $\Delta=P-J$ from the FIG. 5A analysis and $\Delta \geq P/2+J/2$ from the FIG. 5B analysis. Substituting P−J for the $\Delta$ in the equation $\Delta \geq P/2+J/2$ leads to the equation $P-J \geq P/2+J/2$. The equation $P-J \geq P/2+J/2$ reduces to $J \leq P/3$.

Therefore, although the value of J is unknown, the method and system derive that the largest tolerance for the jitter which the malicious message detection process provided by the method and system can take is $J=P/3$. Accordingly, it is required that $J \leq P/3$ for the malicious message detection process provided by the method and system to work optimally. Such tolerance is relatively large and in typical operating conditions the jitter will be less than one-third of the period.

Figure 6:
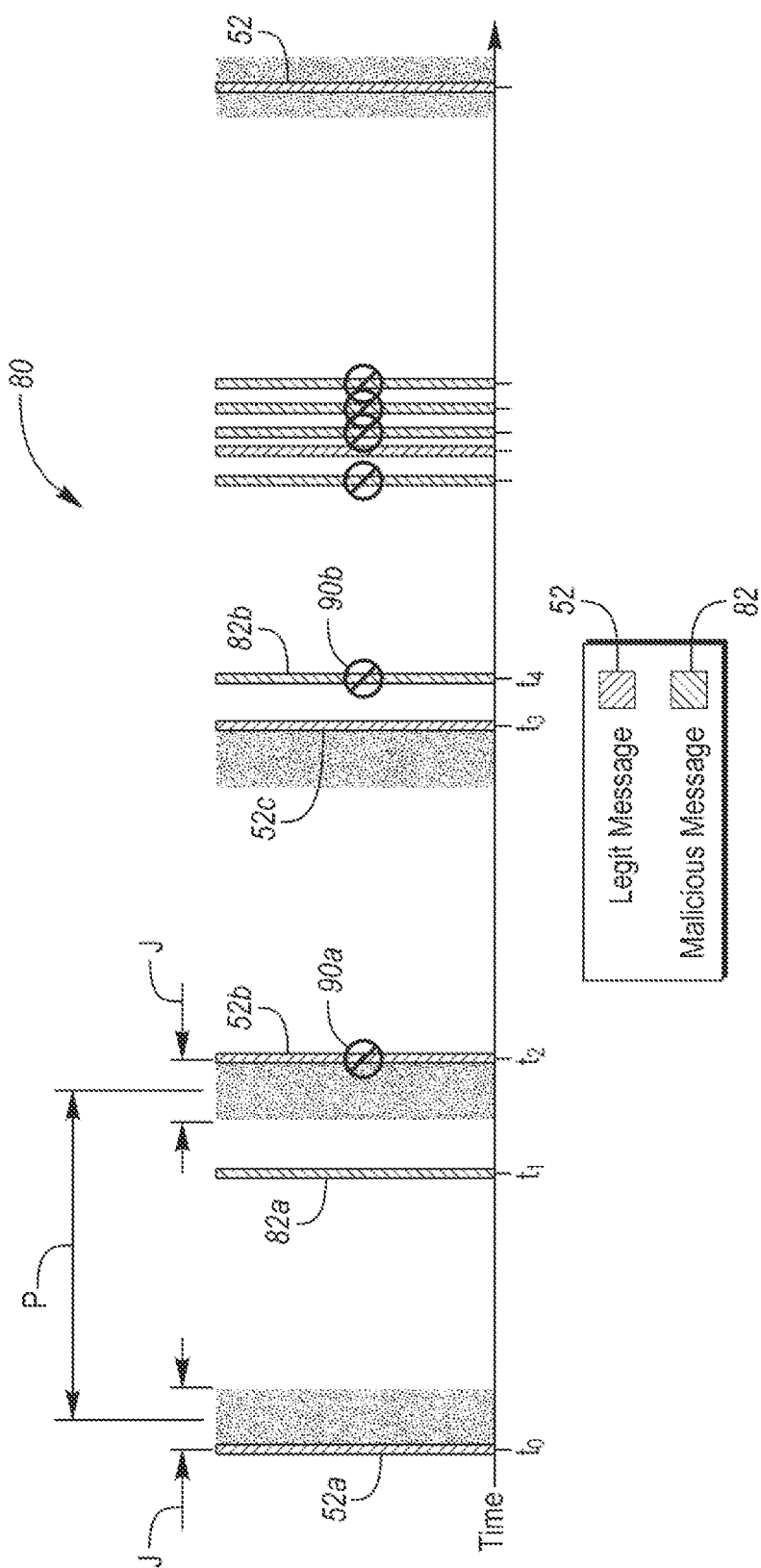
FIG. 6 illustrates a timing diagram indicative of operation of the method and system in detecting malicious messages injected into benign periodic messages of the CAN bus.

Referring now to FIG. 6, a timing diagram 80 indicative of operation of the method and system in detecting malicious messages injected into benign periodic messages of CAN bus 12 is shown. As shown in timing diagram 80, legitimate periodic messages 52 and illegitimate (malicious) messages 82 are present in the CAN traffic.

As described, the basic operation of the method and system entail saving the timestamp of a received message per CAN ID. The current timestamp and the prior timestamp are compared to determine a difference thereof. If the difference is less than a limit, where the limit=the difference of the period−the jitter (i.e., $\Delta=P-J$), then an attack is detected.

However, although the period (P) is known, the jitter (J) is unknown. The method and system deal with the jitter (J) being unknown by deriving the largest tolerance for the jitter (J) which the malicious message detection process provided by the method and system can take. This largest tolerance is $J=P/3$ (derived under the assumption that jitter in a correct system is symmetrical and bounded).

Accordingly, the limit (i.e., $\Delta=P-J$) is configured by simplifying the jitter (J) to be one-third the period (P) (i.e., $J=P/3$). In this case the limit is equal to two-thirds the period (i.e., $\Delta=P-J=P-P/3=2P/3$). Therefore, if the difference between neighboring messages is less than two-thirds the period (P), then an anomaly is detected (steps 44 and 46 in FIG. 3). Otherwise, if the difference between neighboring messages is greater than two-thirds the period (P), then no anomaly is detected (steps 44 and 48 in FIG. 3).

For clarity, the operation illustrated in timing diagram 80 of FIG. 6 will be described in greater detail. A first legitimate message 52a is received at a time $t_0$. The time $t_0$ starts a detection window. A first malicious message 82a is subsequently received at a time $t_1$. First legitimate message 52a is the previous message and first malicious message 82a is the current message. The difference between the time $t_1$ of first malicious message 82a and the time $t_0$ of first legitimate message 52a is not less than two-thirds of the period (P) (i.e., $t_1-t_0>2P/3$). Accordingly, no anomaly is reported when first malicious message 82a is received. First malicious message 82a is then considered as being the previous message with the time $t_1$ starting a new detection window. The time $t_0$ of first legitimate message 52a is not of further use.

A second legitimate message 52b is then received at a time $t_2$. Second legitimate message 52b is the current message. The difference between the time $t_2$ of second legitimate message 52b and the time $t_1$ of first malicious message 82a is less than two-thirds of the period (P) (i.e., $t_2-t_1<2P/3$). Accordingly, an anomaly is reported when second legitimate message 52b is received, as indicated by warning sign 90a in FIG. 6. Second legitimate message 52b is then considered as being the previous message with the time $t_2$ starting a new detection window. The time $t_1$ of first malicious message 82a is not of further use.

A third legitimate message 52c is then received at a time $t_3$. Third legitimate message 52c is the current message. The difference between the time $t_3$ of third legitimate message 52c and the time $t_2$ of second legitimate message 52b is not less than two-thirds of the period (P) (i.e., $t_3-t_2>2P/3$). Accordingly, no anomaly is reported when third legitimate message 52c is received. Third legitimate message 52c is then considered as being the previous message with the time $t_3$ starting a new detection window. The time of second legitimate message 52b is not of further use.

A second malicious message 82b is then received at a time $t_4$. Second malicious message 82b is the current message. The difference between the time $t_4$ of second malicious message 82b and the time $t_3$ of third legitimate message 52c is less than two-thirds of the period (P) (i.e., $t_4-t_3<2P/3$). Accordingly, an anomaly is reported when second malicious message 82b is received, as indicated by warning sign 90b in FIG. 6. Second malicious message 82b is then considered as being the previous message with the time $t_4$ starting a new detection window. The time $t_3$ of third legitimate message 52c is not of further use. The operation then continues this pattern as illustrated in timing diagram 80.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A communications network on-board a vehicle, the communications network comprising:

a Controller Area Network (CAN) bus configured to periodically broadcast legitimate messages with a known period for receipt by vehicle devices connected to the CAN bus, whereby being periodically broadcasted with the known period the legitimate messages are periodic legitimate messages; and a vehicle device having an electronic control unit (ECU) connected to the CAN bus, the ECU having a receiver configured to receive messages from the CAN bus and a controller in communication with the receiver for detecting malicious messages injected into the periodic legitimate messages;

wherein the controller is configured to detect an anomaly in response to the receiver receiving a second message from the CAN bus before a predetermined time after the receiver received a first message from the CAN bus and the controller is further configured to, in response to detecting the anomaly, ignore the second message which the controller would have otherwise acted on in controlling the vehicle device, wherein the predetermined time is two-thirds of the known period; and the controller is further configured to detect no anomaly in response to the receiver receiving the second message from the CAN bus after the predetermined time after the receiver received the first message from the CAN bus and the controller is further configured to, in response to detecting no anomaly, control the vehicle device according to the second message.

2. The communications network of claim 1 wherein:

the controller is further configured to detect an anomaly in response to the receiver receiving a third message from the CAN bus before the predetermined time after the receiver received the second message from the CAN bus, and the controller is further configured to detect no anomaly in response to the receiver receiving the third message from the CAN bus after the predetermined time after the receiver received the second message from the CAN bus.

3. The communications network of claim 2 wherein:

the controller is further configured to detect an anomaly in response to the receiver receiving a fourth message from the CAN bus before the predetermined time after the receiver received the third message from the CAN bus, and the controller is further configured to detect no anomaly in response to the receiver receiving the fourth message from the CAN bus after the predetermined time after the receiver received the third message from the CAN bus.

4. The communications network of claim 1 wherein:

the ECU is or forms a part of an engine control unit, a transmission control unit, an airbag control unit, a power windows control unit, and a braking control unit.

* * * * *